United States Patent [19]
Blair et al.

[11] Patent Number: 5,671,386
[45] Date of Patent: *Sep. 23, 1997

[54] SYSTEM FOR STORING DATA AND FOR PROVIDING SIMULTANEOUS PLURAL ACCESS TO DATA BY CONNECTING EACH ACCESS CHANNEL TO EACH AND EVERY ONE OF STORAGE ARRAYS

[75] Inventors: David Kim Blair, Bennion; Scott Karl Curtis; Philip Harrison Lucht, both of Salt Lake City, all of Utah

[73] Assignee: Philips Electronics North America Corporation, New York, N.Y.

[ * ] Notice: The term of this patent shall not extend beyond the expiration date of Pat. No. 5,539,660.

[21] Appl. No.: 389,672

[22] Filed: Feb. 16, 1995

Related U.S. Application Data

[63] Continuation-in-part of Ser. No. 125,996, Sep. 23, 1993, Pat. No. 5,539,660.

[51] Int. Cl.⁶ .................................................. G06F 12/00
[52] U.S. Cl. ......................................................... 395/405
[58] Field of Search ................................. 395/402, 405, 395/427, 441, 454, 484, 182.04, 200.02, 200.03, 200.09, 888; 348/7, 13, 6, 16; 370/53; 365/230.03

[56] References Cited

U.S. PATENT DOCUMENTS

| | | | |
|---|---|---|---|
| 3,893,088 | 7/1975 | Bell | 365/78 |
| 4,421,965 | 12/1983 | Gentric et al. | 200/175 |
| 4,949,171 | 8/1990 | Grandmougin | 348/705 |
| 4,949,187 | 8/1990 | Cohen | 386/69 |
| 5,038,277 | 8/1991 | Altman et al. | 395/250 |
| 5,163,131 | 11/1992 | Row et al. | 395/200.01 |
| 5,179,552 | 1/1993 | Chao | 370/427 |
| 5,237,658 | 8/1993 | Walker et al. | 395/858 |
| 5,311,423 | 5/1994 | Clark | 395/208 |
| 5,341,258 | 8/1994 | Chalmers et al. | 360/92 |
| 5,341,474 | 8/1994 | Gelman et al. | 395/200.09 |
| 5,355,453 | 10/1994 | Row et al. | 395/200.09 |
| 5,371,532 | 12/1994 | Gelman et al. | 348/7 |
| 5,392,244 | 2/1995 | Jacobson et al. | 395/441 |
| 5,440,336 | 8/1995 | Buhro et al. | 348/13 |
| 5,539,660 | 7/1996 | Blair et al. | 348/7 |
| 5,544,339 | 8/1996 | Baba | 395/441 |

OTHER PUBLICATIONS

TQS Digital Communications and Signal Processing, Digital Crosspoint Switch No. TQ8016, 8 pages.

Sakamoto et al., "Multimedia integrated switching architecture for visual information retrieval systems", SPIE, vol. 1908, 1993, pp. 123-132.

*Primary Examiner*—Moustafa M. Meky

[57] ABSTRACT

A system having N access channels, M individual disk storage arrays, a commutator for connecting each of the access channels to each of the storage arrays; and a control unit for causing the commutator to connect each of the access channels to each of the storage arrays. The disk storage arrays are capable of storing contiguous segments of a data block. In the case of movies, each segment includes, for example, a few seconds of each relevant movie. The commutator connects the access channels to the disk storage arrays in a manner whereby each of the access channels has access to all of the data. The system is such that each access channel can receive data at the maximum system bandwidth. In addition, data can be written into the storage arrays by one access channel, while another of the access channels is receiving data, both at the maximum system bandwidth. In one embodiment of the system, each of the access channels is connected to a downstream channel, in which at least two of those downstream channel have a different bandwidth than the system bandwidth. In such an embodiment, each of the downstream channels can receive the same data at its desired bandwidth.

42 Claims, 11 Drawing Sheets

SYSTEM FOR STORING DATA AND FOR PROVIDING SIMULTANEOUS PLURAL ACCESS TO DATA BY CONNECTING EACH ACCESS CHANNEL TO EACH AND EVERY ONE OF STORAGE ARRAYS

CROSS-REFERENCE TO RELATED APPLICATION

This application is a continuation-in-part of application Ser. No. 08/125,996, filed Sep. 23, 1993 and now issued as U.S. Pat. No. 5,539,660.

BACKGROUND OF THE INVENTION

1. Field of The Invention

The invention relates to a system which provides simultaneous access for a number of users to a mass storage medium.

One of the advantages of present day cable television is the provision of pay-per-view features. However, a drawback is that a viewer is locked into viewing a program at the time that the program is provided by a cable supplier.

A new service being proposed is video-on-demand, where, for example, a movie selected by a user is provided to the user when desired by the user. One problem in implementing this type of service is being able to store a large number of individual movies effectively. Another problem is being able to access and deliver those stored individual movies to different users.

2. Description of The Related Art

The first problem may be addressed by various data compression schemes in which video information is digitized and then compressed (JPEG, MPEG, etc.). The compressed data may then be stored in a mass storage medium.

The second problem is more problematical. There are various proposals for constructing a bus system ("big bus") for connecting the mass storage medium to a distribution system, e.g., a cable system. However, the design of such a "big bus" is very complicated and is not subject to expansion. To achieve a high data bandwidth, the "big bus" would have to incorporate costly ultra-high speed components, since a bus has only one data path. In addition, in a high-bandwidth parallel digital bus type system having many data lines, devices attached to the bus must be physically close to the bus, and the bus can have only a limited physical length. Furthermore, such a bus would be very expensive.

SUMMARY OF THE INVENTION

It is an object of the present invention to provide a system of the above type which is easily expandable.

It is a further object of the present invention to provide such a system in a more economical fashion.

The above objects are achieved in a system for storing large amounts of data and for providing simultaneous plural access to the data which comprises (a) an access medium having N access channels; (b) a mass storage medium having M individual storage arrays for storing the data; (c) a commutator having establishable paths for connecting each of the access channels to each of the storage arrays; and (d) a control unit for controlling the commutator to cause each of the access channels to be connected to each and every one of the storage arrays by means of the paths in a period T.

The subject invention is a distributed record/playback (write/read) storage system in which data segments (files) are each sub-divided into smaller data blocks which are written onto a set of storage arrays, preferably in a cyclic fashion. The data so stored can be randomly accessed (for reading and/or writing) simultaneously by a multitude of access channels.

To enable such simultaneous access, the access channels are connected to the storage arrays by means of a commutator, which is essentially a switching device (for example, implemented by means of a cross-point matrix switch or through use of multiplexers). The commutator has establishable paths for connecting each of the access channels to each of the storage arrays. An established path, i.e., is a path which has been established, is a path within the commutator which connects one of the access channels to one of the storage arrays. At a given time, the commutator has at least Q established paths, where Q is the lesser of N and M when they are different and N when they are the same. Each of the established Q paths connects a different one of the access channels to a different one of the storage arrays. The commutator operates in a fashion whereby during the period T each of the access channels is connected to each and every one of the storage arrays for some amount of time by switching the Q paths which are established.

Accordingly, in a system in accordance with the invention, the commutator has Q paths established at a time, which each connects a different one of said access channels to a different one of said storage arrays, where Q is equal to the lesser of N and M when they are different and N when they are the same; and the control unit is adapted to cause the commutator to switch the Q paths which are established so that in the period T each of the access channels is connected to each and every one of said storage arrays. In one embodiment of such a system, the control unit is adapted to cause the commutator to switch the Q paths which are established (among the access channels and the storage arrays) so that $$T = P \times t$$

where P is the greater of N and M when they are different and N when they are the same, t is the time in which one of the Q paths which is established connects one of the access channels to one of the storage arrays, and T is the time in which one of the access channels is connected to each and every one of the storage arrays. It is often desirable to have the commutator operate in a cyclic fashion in connecting the access channels to the storage arrays.

The invention solves the problem of allowing multiple channels to have high-bandwidth (real-time in the case of video) access into a common data pool in which each item is recorded only once, thus saving storage space and cost. Multiple storage arrays are necessary due to the large amount of data storage and bandwidth required in many applications. Multiple simultaneous access channels are desirable because many "users" often wish to have independent access to all of the data, as is the case with a conventional network computer "file server". However, in such a conventional file server, users must share the bandwidth of the network. The invention, in effect, provides each user with the ability to have a full bandwidth private channel to all of the data.

In addition, the invention is also capable of allowing certain users to have full bandwidth while at the same time allowing others to have lesser degrees of bandwidth in an efficient manner whereby all users are able to have access to the data stored in the common data pool and receive that data at the required bandwidth. Such an embodiment of a system in accordance with the invention comprises (a) an access medium having N access channels; (b) a mass storage medium having M individual storage arrays for storing the data, where M is less than N; (c) a commutator having M established paths at a time, which each (i) connects a different one of the access channels to a different one of the storage arrays and (ii) is adapted to transfer data between one of the access channels and one of the storage arrays at a system bandwidth; (d) N downstream channels, which each is coupled to a different one of the access channels and has a bandwidth, in which at least two of the downstream channels have bandwidths which differ from the system bandwidth; and (e) a control unit for controlling the commutator to cause the commutator to switch the (established) paths among the access channels and the storage arrays so that each downstream channel receives a sufficient amount of data during a period $T_s$ to maintain its bandwidth. Since the invention has multiple access channels, one or more of those can be dedicated all the time (or some of the time) to the task of high-speed loading of data into the system, as the system continues to operate on its other channels. This is not possible with a conventional network file server where the single access channel must be time-shared between the loading function and normal access functions.

The subject invention is similar to the generally known RAID (Random Array of Independent Disks) method for storing computer data by distributing it on multiple disk drives. However a significant difference is that the RAID systems have only one access channel, whereas the subject invention supports a multitude of simultaneous access channels, each of which has access to the entire data pool.

BRIEF DESCRIPTION OF THE DRAWINGS

With the above and additional objects and advantages in mind as will hereinafter appear, the invention will be described with reference to the accompanying drawings, in which.

DESCRIPTION OF THE PREFERRED EMBODIMENTS

Figure 1:
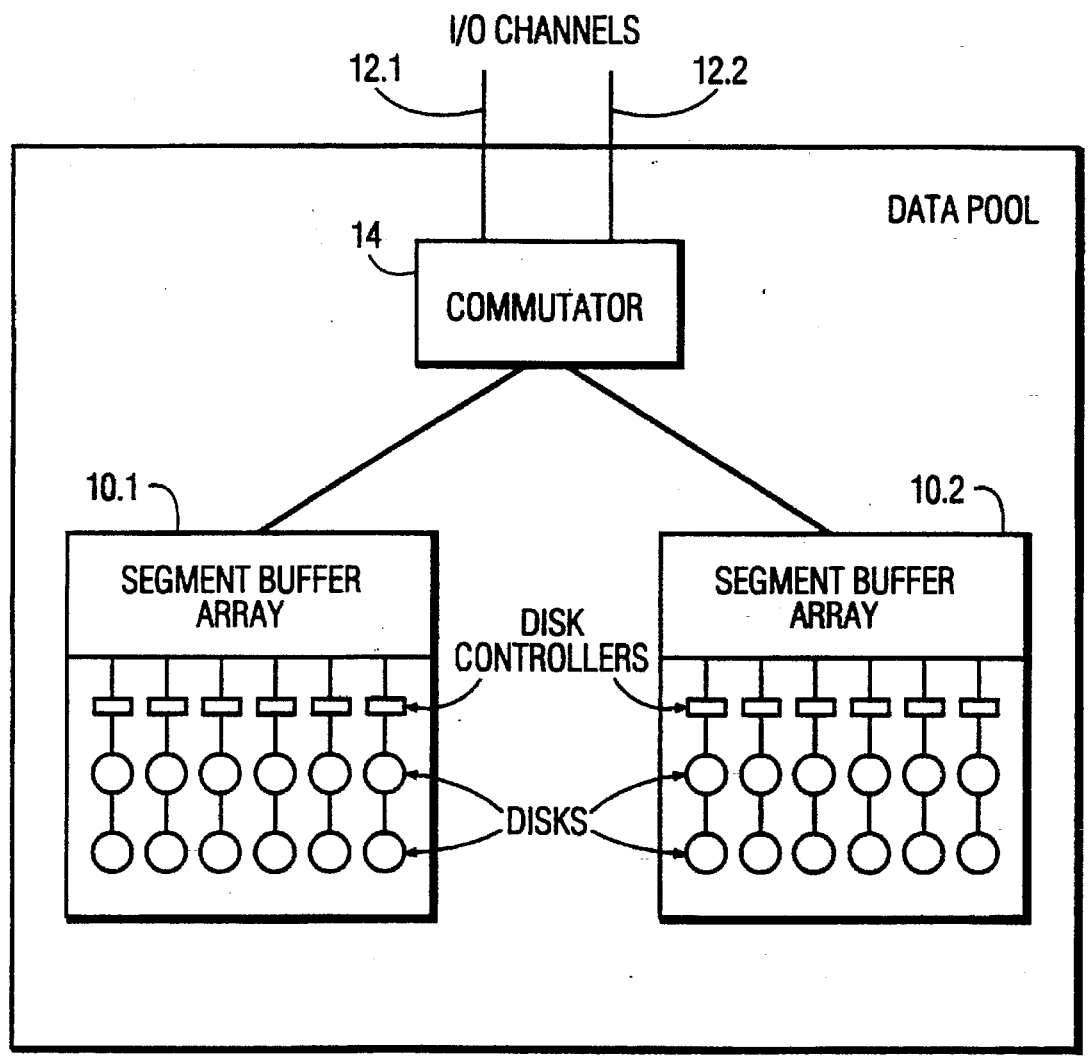
FIG. 1 shows a simplified block diagram of a first embodiment of a system in accordance with the invention having two input/output access channels and two storage arrays.

A first embodiment of a system in accordance with the invention is shown in FIG. 1. Therein, the system includes two storage arrays 10.1 and 10.2, two input/output I/O access channels 12.1 and 12.2, and a commutator 14 for connecting the storage arrays to the I/O access channels. Under the control of a controller (not shown), the commutator 14 repetitively and alternately connects the I/O access channel 12.1 to the storage arrays 10.1 and 10.2, respectively, while simultaneously, repetitively and alternately connecting the I/O access channel 12.2 to the storage arrays 10.2 and 10.1, respectively. Depending on the cycle time of the commutator 14, each I/O access channel 12.1 and 12.2 has access to all of the stored data.

Figure 2:
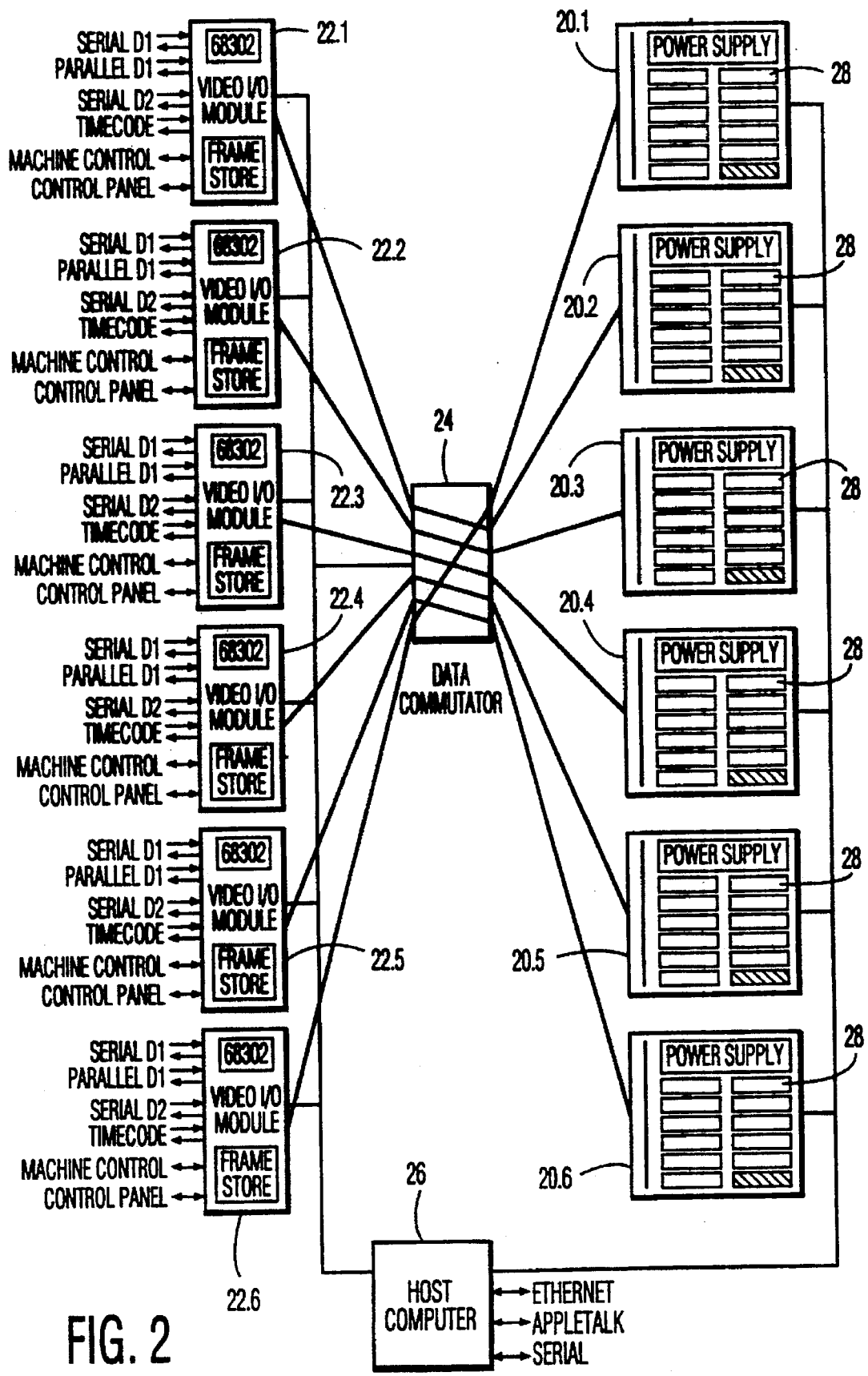
FIG. 2 shows a block diagram of a second embodiment of a system in accordance with the invention having six input/output access modules and six storage arrays for use as a multi-channel disk recorder.

FIG. 2 shows a second embodiment of a system in accordance with the invention for use as a multi-channel disk digital video recorder. This embodiment includes six storage arrays 20.1–20.6, six video I/O access modules 22.1–22.6, a commutator 24 and a host controller 26 in the form of a microcomputer. This system behaves as six independent VTRs with the distinction that the stored data is in a common pool which is accessible to all six "video heads". Each video module acts as either a record head or a playback head on this common data pool. It is of course possible that the video module may operate in both record and playback simultaneously. All six "video heads" can access this common pool simultaneously, in a manner conducive to non-linear editing. Any "video head" can switch between playback and record on any field boundary. Assuming for the moment that error correction is turned off and there is no data compression, each storage array, which includes twelve disk drives 28, can store, for example, 8 minutes of 10-bit D1 digital video data, so that the total system storage is 6×8=48 minutes. The data is stored on 6×12=72 disk drives. In fact, each field recorded from any of the six video channels is "sprayed" onto all 72 disk drives, so that each drive holds 1/72nd of each recorded field. Thus, when any field is read from the disk system, all 72 disk drives work in parallel to fetch the data for that field. Thus, the maximum disk bandwidth is utilized on every field access.

The commutator 24 is what allows the data for each video channel to be delivered to or from all six storage arrays 20.1–20.6. The commutator 24 is like a 6-pole rotating switch which switches to a new position, for example, six times per video field, causing each field to be spread onto all six storage arrays. In FIG. 2, the commutator is shown in one of its six possible positions.

Figure 3:
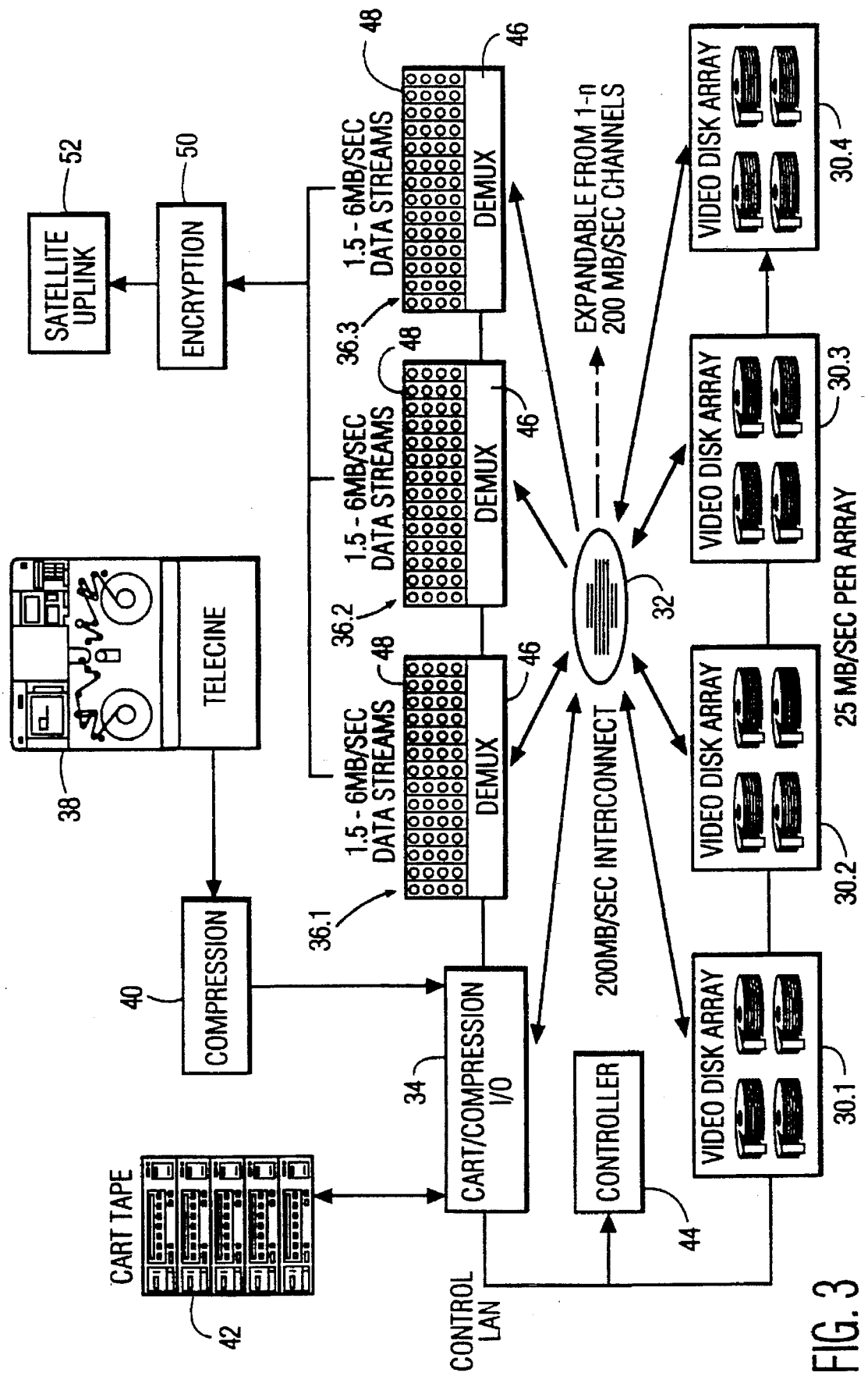
FIG. 3 shows a block diagram of a third embodiment of a system in accordance with the invention having three output access modules, one input/output access module and four storage arrays for use in a video supply system.

As noted above, it is contemplated that a system in accordance with the invention be used in a video-on-demand system. FIG. 3 shows an embodiment of such a system which includes four storage arrays 30.1–30.4, a commutator 32, an input/output access module 34, and three video output access modules 36.1–36.3. As noted above, this system dedicates one access channel, input/output access module 34, exclusively for the task of high-speed loading of data into the system, while the system continues to operate on the other channels. To this end, a telecine 38 is shown for the transfer of film to video. The output from the telecine 38 is coupled to the input/output access module 34 through a digital video compression circuit 40. Additionally, tape cartridges containing video information may be loaded into the system via the tape drive arrangement 42 also coupled to the input/output access module 34. Each of the above devices are controlled by controller 44. While this embodiment shows three channels for outputting the stored video information, it should be recognized that significantly greater capacity may be had through the use of multiplexing. In particular, during each cycle of transfer of information from the various storage arrays, multiple sub-channels of information may be multiplexed. To this end, each of the video output access modules 36.1–36.3 includes a demultiplexer 46 coupling the bus from the commutator to a plurality of sub-channels 48 corresponding to the sub-channels of information retrieved from the storage arrays. These sub-channels 48 are then coupled to an encryption circuit 50 for transmission through a satellite uplink 52.

In a practical implementation of the above embodiment, a system may require the storage of 1,000 movies on-line and 1,600 movies near-line (i.e., access within 1 minute, for example, stored on tape), which are required to be accessed by 2,000 outputs. Assuming that each disk drive in the storage arrays is capable of storing 2 Gigabytes of information, the system would require at least 17 storage arrays each having 40 disk drives giving the system a total storage capacity of 1,350. GB. The commutator would then have 17 established paths connecting to one input/output access module and 16 video output access modules each having 128 demultiplexed sub-channel outputs.

Figure 4:
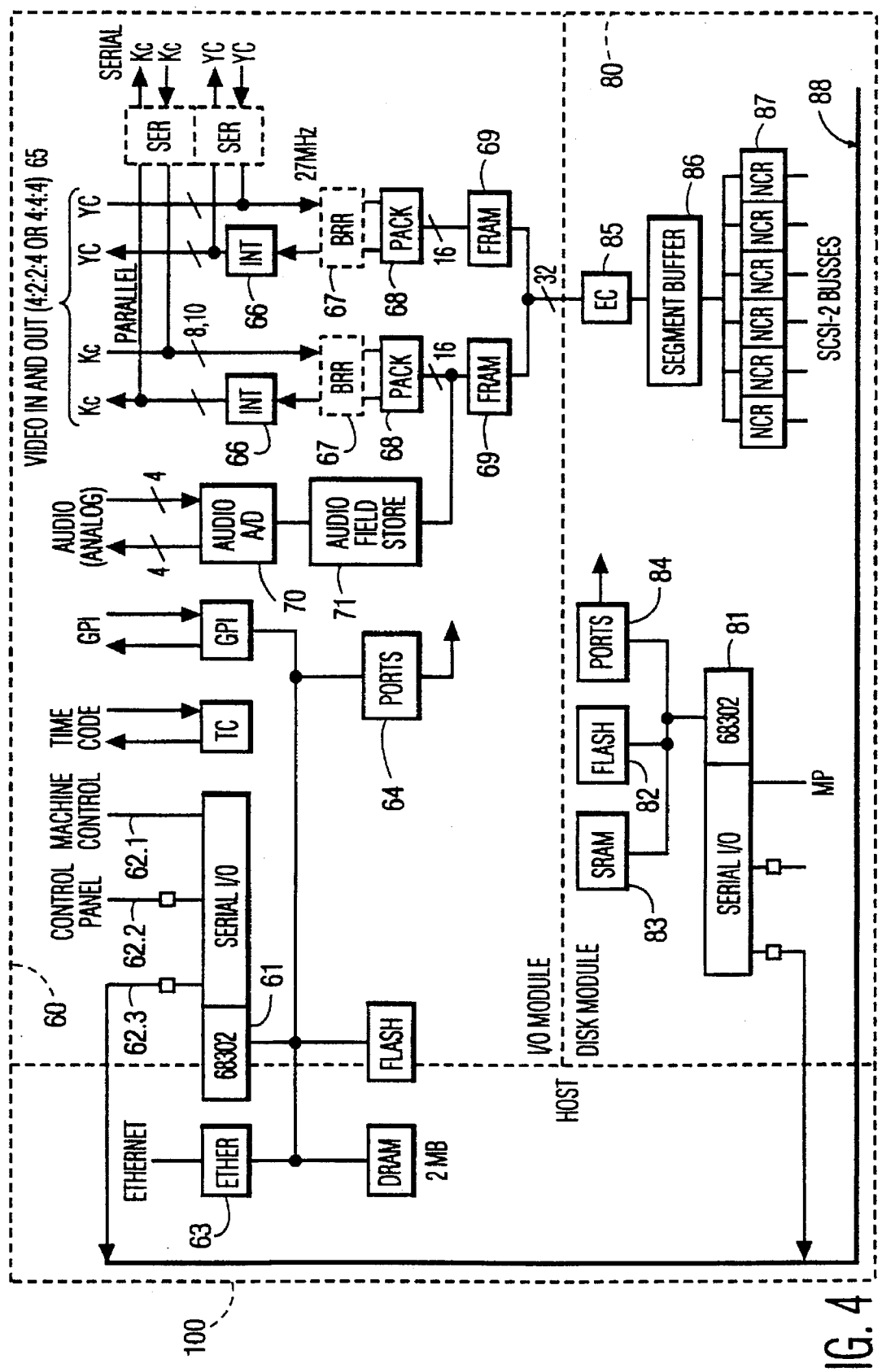
FIG. 4 shows a detailed block diagram of a typical storage array of a system in accordance with the invention.

FIG. 4 shows a detailed block diagram of a typical I/O module 60, disk module 80, and host (control unit) 100 of the type which can be used in a system according to the invention. Specifically, FIG. 4 shows the relationship between those devices when the I/O module 60 is connected directly to the storage array 80. The I/O module 60 manages the input and output of video, audio, and control information to and from the external world. The input data is converted from video formats to a generic computer data format and is then transmitted to the disk module 80, as shown on the center right side of the figure. During the play process, this generic data is returned by the disk module 80, and is converted back to video/audio data by the I/O module 60. The I/O module is controlled by a microprocessor 61, Motorola 68302 CPU. This microprocessor contains a standard 68000 "core" and three high-speed serial channels 62.1–62.3. Each channel connects to a serial line, as shown at the top of the figure ("Serial I/O"). The small squares indicate LocalTalk adapters which in effect convert the serial line to a local area network (e.g., AppleTalk).

One serial line 62.1 is used for machine control. This allows the storage array to emulate a standard VTR. Timecode and GPI functions are also associated with machine control.

A second serial line 62.2 goes to a control panel which allows manual operation of the storage array.

The third serial line 62.3 connects directly to a serial line on the microprocessor in the disk module.

An Ethernet interface 63 provides for the transfer of image data between the storage array and a system controller.

A set of control and status registers 64 (PORTS) allows the 68302 to manage the flow of data in the data path section on the upper right side of the figure.

At the top of the data path are two 601-style video inputs and outputs 65. These are labeled YC for the normal picture channel, and Kc for the extra channel. In 4:2:2:2 mode, K is the key data. In 4:4:4 mode, c is the extra color information which is combined with the C of YC. It is also possible to operate in an RGB 4:4:4 mode.

The INT boxes 66 represent temporal and spatial field interpolators. These operate only on outgoing video data. The BRR boxes 67 denote a possible place for adding Bit Rate Reduction hardware to the system. The PACK boxes 68 are where the video formatted data is converted to generic 32-bit-wide computer data, and where sync data is removed from the data stream. This packing function allows for efficient data storage in both 8-bit and 10-bit video modes.

Data then flows into a set of FIFO RAM buffers 69 which allows for quasi-frame synchronization on the inputs. Data then transfers from the FRAM buffers into the disk module.

Four channels of analog audio data are digitized (16-bits/channel, 48KHz) in audio A/D 70 and are buffered in audio frame store 71 and then appended to the generic data in one of the FRAMs.

The disk module 80 transfers the generic computer data from the I/O module 60 to and from a set of Fast SCSI-2 (Small Computer Standard Interface) disk drives. The disk drives are controlled by NCR SCSI controller chips, which are in turn managed by a second Motorola 68302 CPU processor 81, with its associated FLASH RAM 82 and Static SRAM 83. As with the I/O module, this 68302 has three serial channels: one goes to the other 68302 in the I/O module, the second is used as a Maintenance Panel access point for debug purposes, and the third is unused. The PORTS box 84 indicates the registers used to control the data path on the lower right.

Data from the I/O module 60 enters the disk module and passes through an error correction circuit EC 85. Here, redundant data is generated which protects the user against the failure of any single SCSI disk drive. The error-corrected data is then fed into a segment buffer 86, where large "segments" of generic data are accumulated for writing to disk. The data segments are steered to one of several NCR SCSI controller chips 87. In turn, these chips direct the data to one of several SCSI-2 drives 88 which are connected to each SCSI bus.

The data segments must be large so as to minimize the overhead cost of disk seek times. Multiple fields of video data are written in a single shot.

During playback mode, data is retrieved from the disks and placed into the segment buffer. If any disk drive has failed, the error correction circuit reconstitutes the original data stream, and the corrected data is then fed back to the I/O module 60. The system continues to operate as if no failure occurred, and the user is notified that a failed drive should be replaced at the next maintenance opportunity.

The host 100 represents a set of software management and control processes which run on the 68302 CPU of the I/O module 60. For this reason, in the figure, the 68302 CPU processor of the I/O module and its associated FLASH and DRAM memory are extended into the host part of the figure.

In the above description, it has been assumed that the data supplied to the storage array is in analog form. However, in a proposed system where the data is already in generic digital form, the I/O module 60 may be obviated.

The data stored in the storage arrays may be digital or analog in nature. Digitally stored data may be generic data normally associated with a computer file system, or it may be a digital representation of video and/or audio signals. Regardless of what the data represents, it may be stored in a compressed format for dense recording, and may be decompressed on playback.

The purpose of the commutator is to interconnect a plurality of storage arrays and a plurality of I/O access channels. In terms of FIG. 4, one can assume that the I/O access module 60 is actually connected to storage array 80 by means of a commutator (not shown). The concept of the system is such that each I/O access channel will access many or all of the storage arrays in a repeated sequential manner. An I/O access channel will only access one storage array at a given time, then it will access the next storage array in the sequence, continuing through the full sequence. The other I/O access channels in the complete system are also being sequentially switched to the storage arrays, such that all of the active I/O access channels access each of the active storage arrays on a time shared basis.

The commutator may be implemented as a cross-point matrix switch. The cross-point matrix switch has a number of inputs, designated by "N" in FIGS. 5a–5e, and a number of outputs, designated by "M" in the figures. Cross-point matrix switches allow any output to be connected to any single input at any time and in any combination. An example of a cross-point matrix switch is the 16×16 Digital Cross-point Switch No. TQ8016, made by TQS Digital Communications and Signal Processing. This switch is capable of handling a 1.3 Gbit/s data rate as a minimum. A user of this switch may independently configure any switch output to any input, including an input chosen by another output. To this end, the controller 44 of FIG. 3 (or the host computer 26 of FIG. 2) is programmed to periodically generate the appropriate output addresses for the inputs of the switch to, in effect, commutate the switch cyclically through each of the connections.

Figure 5A:
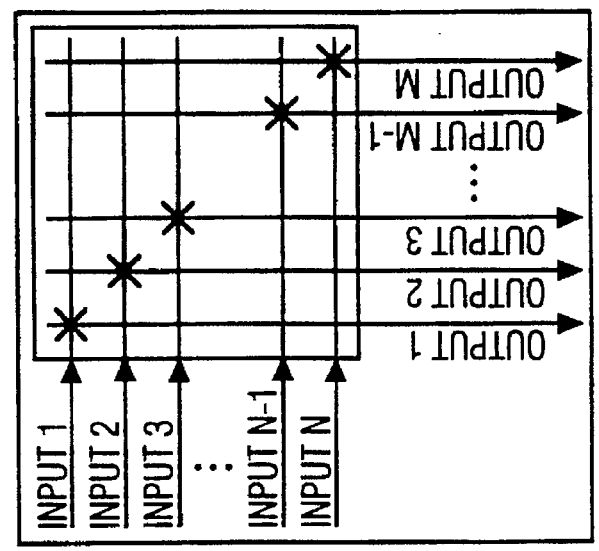
FIGS. 5a–5e show the various switching positions of an embodiment of a commutator in accordance with the invention in the form of a cross-point matrix switch.
Figure 5B:
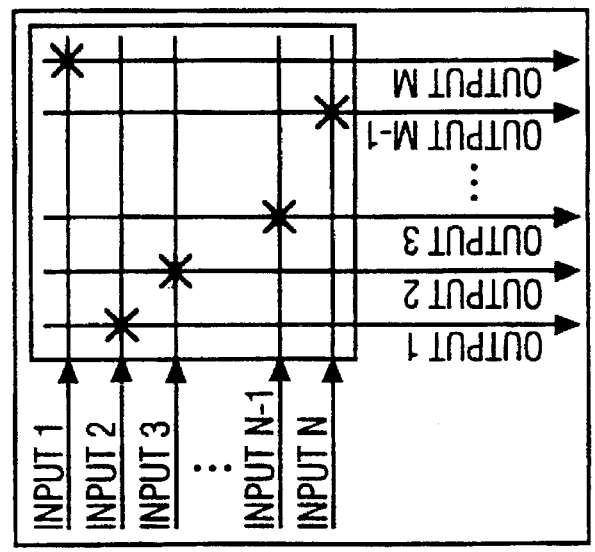
Figure 5C:
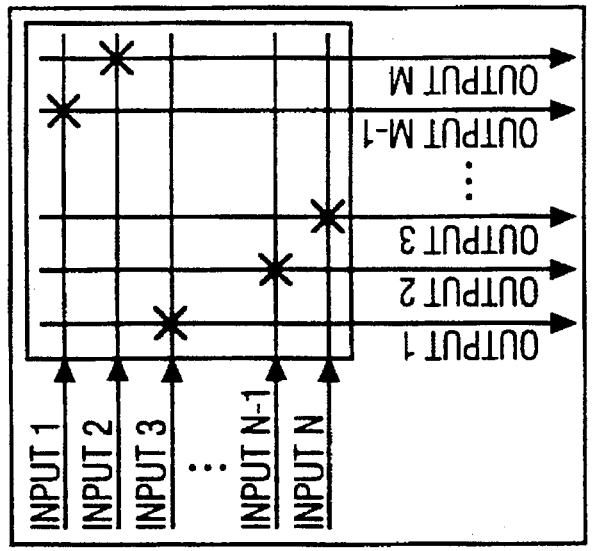
Figure 5D:
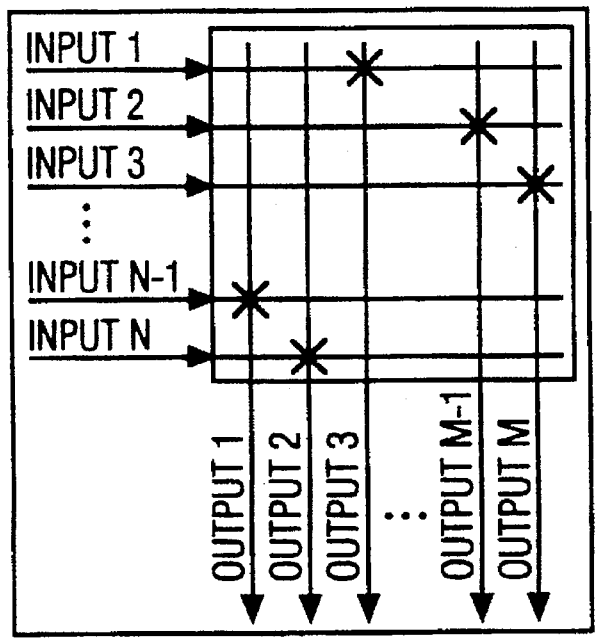
Figure 5E:
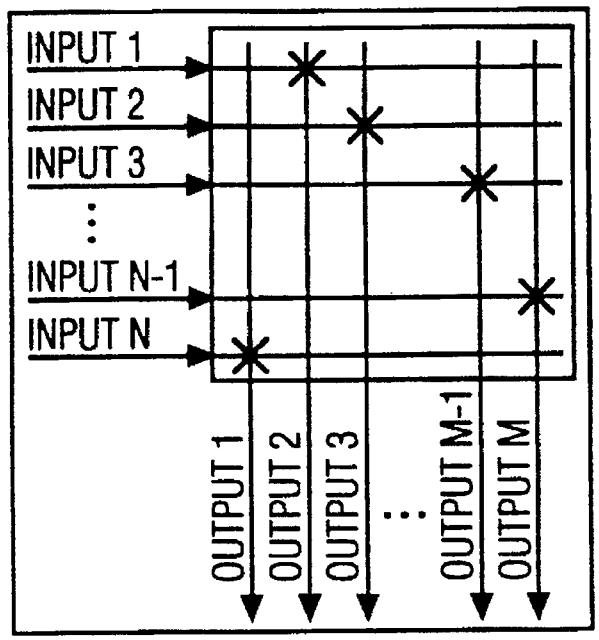

FIGS. 5a–5e illustrate the operation of a cross-point matrix switch when used as a commutator, with the "X" marks indicating the cross-points that have been turned on making a connection from the designated input to the designated output. FIG. 5a shows a possible starting condition where output 1 is connected to input 1, output 2 is connected to input 2, etc. FIG. 5b shows a configuration for the next position where output 1 is connected to input 2, output 2 is connected to input 3, etc., with output M being connected to input 1. FIGS. 5c and 5d show the next two conditions, while FIG. 5e shows the condition just prior to the sequence repeating and making the connections shown in FIG. 5a.

Figure 6:
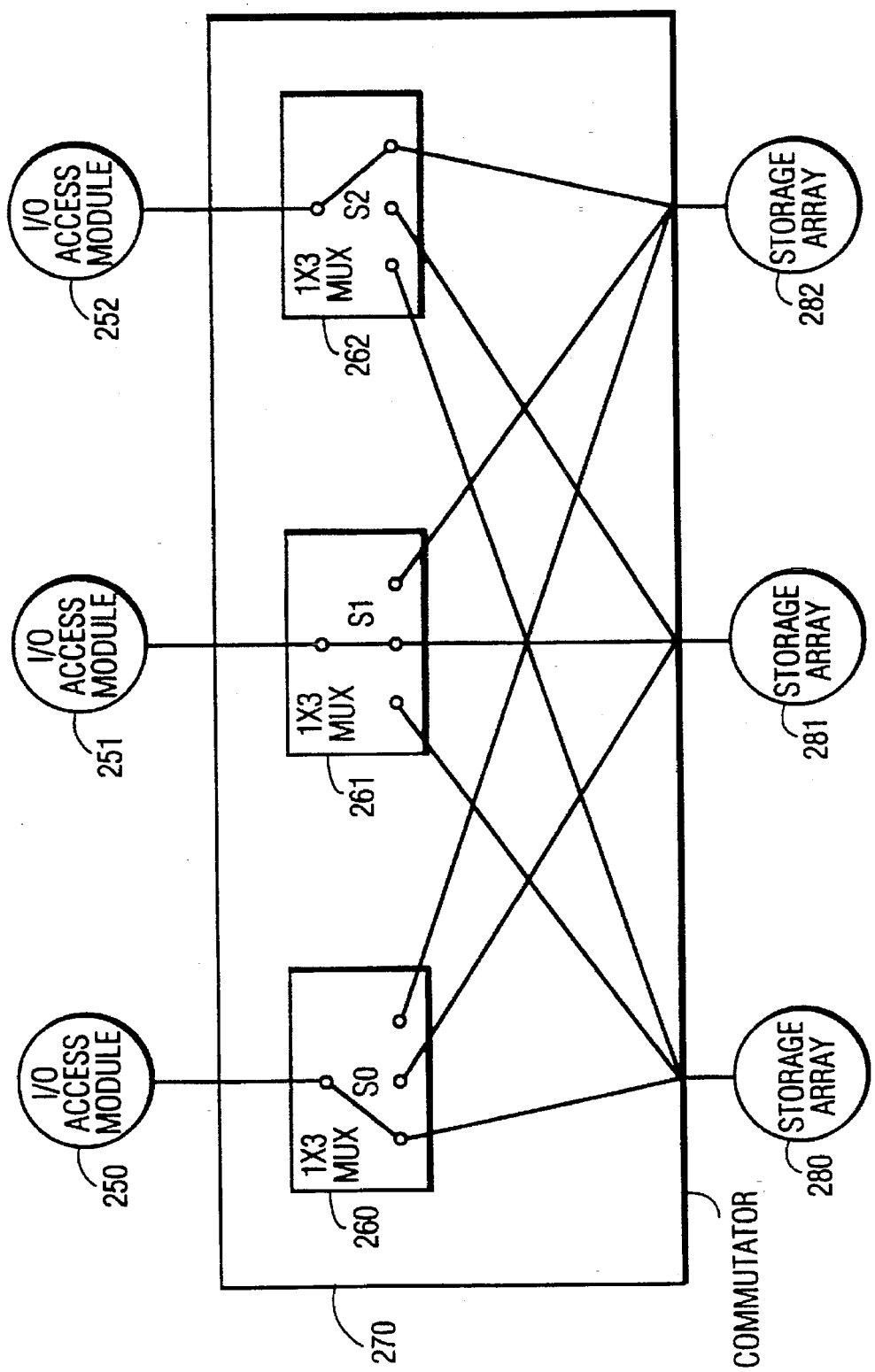
FIGS. 6–8 show block diagrams of embodiments of systems in accordance with the invention which have commutators which use multiplexers.

The commutator may also be implemented through use of multiplexers (MUXs). FIG. 6 shows an embodiment of a system in accordance with the invention having a commutator 270 which employs MUXs.

The system shown in FIG. 6 includes three I/O access modules 250–252 connected to one side of the commutator 270, and three storage arrays 280–282 connected to the other side of the commutator 270. The commutator 270 includes three MUXs 260–262. Each of the MUXs 260–262 is a 1-by-3 MUX having its single connection side connected to one of the I/O access modules and each of the 3 connections of its triple connection side connected to a different one of the storage arrays 280–282. (The system shown in FIG. 6 has N 1-by-M MUXs, where N is the number of I/O access modules and M is the number of storage arrays, and N=M.) The single connection side of the MUX 260 is connected to the I/O access module 250; the single connection side of the MUX 261 is connected to the I/O access module 251; and the single connection side of the MUX 262 is connected to the I/O access channel 252. Each of the MUXs 260–262 has a switch, S0, S1 and S2, respectively, included therein which can connect the single connection side thereof to each of the three connections of the triple connection side, but only one at a time.

The MUXs 260–262 of FIG. 6 are controlled by a controller (not shown), such as the controller 44 of FIG. 3 or the host computer 26 of FIG. 2, in a manner whereby each of the I/O access module 250–252 are connected sequentially to each of the storage array 280–282. FIG. 6, shows a possible starting position of the switches S0–S2 of the MUXs 260–262, respectively. In that starting position, the I/O access module 250 is connected via the MUX 260 to the storage array 280; the I/O access module 251 is connected via the MUX 261 to the storage array 281; and the I/O access module 252 is connected via the MUX 262 to the storage array 282. The next possible step of the cycle could be to move the switches S0 and S1 of the MUXs 260 and 261 one position to the right and the switch S2 of the MUX 262 two positions to the left. As result, the I/O access module 250 would be connected via the MUX 260 to the storage array 281, the I/O access module 251 would be connected via the MUX 261 to the storage array 282, and the I/O access module 252 would be connected via the MUX 262 to the storage array 280. The next step of the cycle could be to move the switches S0 and S2 of the MUXs 260 and 262 one position to the right and the switch S1 of the MUX 261 two positions to the left. As result, the I/O access module 250 would be connected via the MUX 260 to the storage array 282, the I/O access module 251 would be connected via the MUX 261 to the storage array 280, and the I/O access module 252 would be connected via the MUX 262 to the storage array 281. The cycle could then be completed by moving the switches S0, S1 and S2 back to their starting positions.

Figure 7:
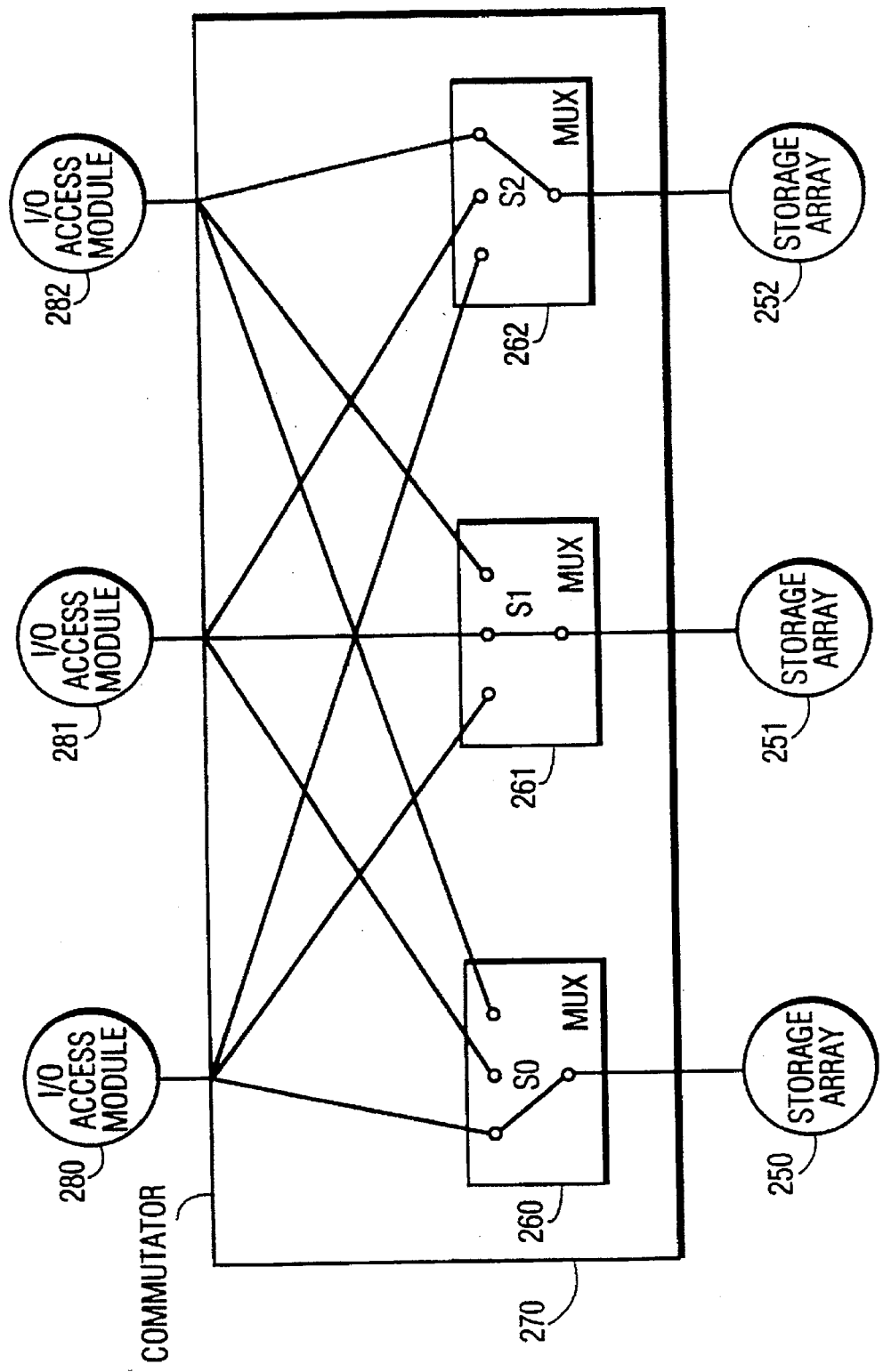

FIG. 6 is only one implementation of a commutator in accordance with the invention which employs MUXs. The commutator of FIG. 6 could be easily modified by interchanging the storage arrays 250–252 with the I/O access modules 280–282. FIG. 7 shows a system in accordance with the invention having such a modified commutator. What has been described above concerning the manner in which the system shown in FIG. 6 operates applies to the system shown in FIG. 7 as well, except that the storage arrays 280–282 of FIG. 7 are in the positions of the I/O access modules 250–252 of FIG. 6, and the I/O access modules 250–252 of FIG. 7 are in the positions of storage arrays 280–282 of FIG. 6.

Figure 8:
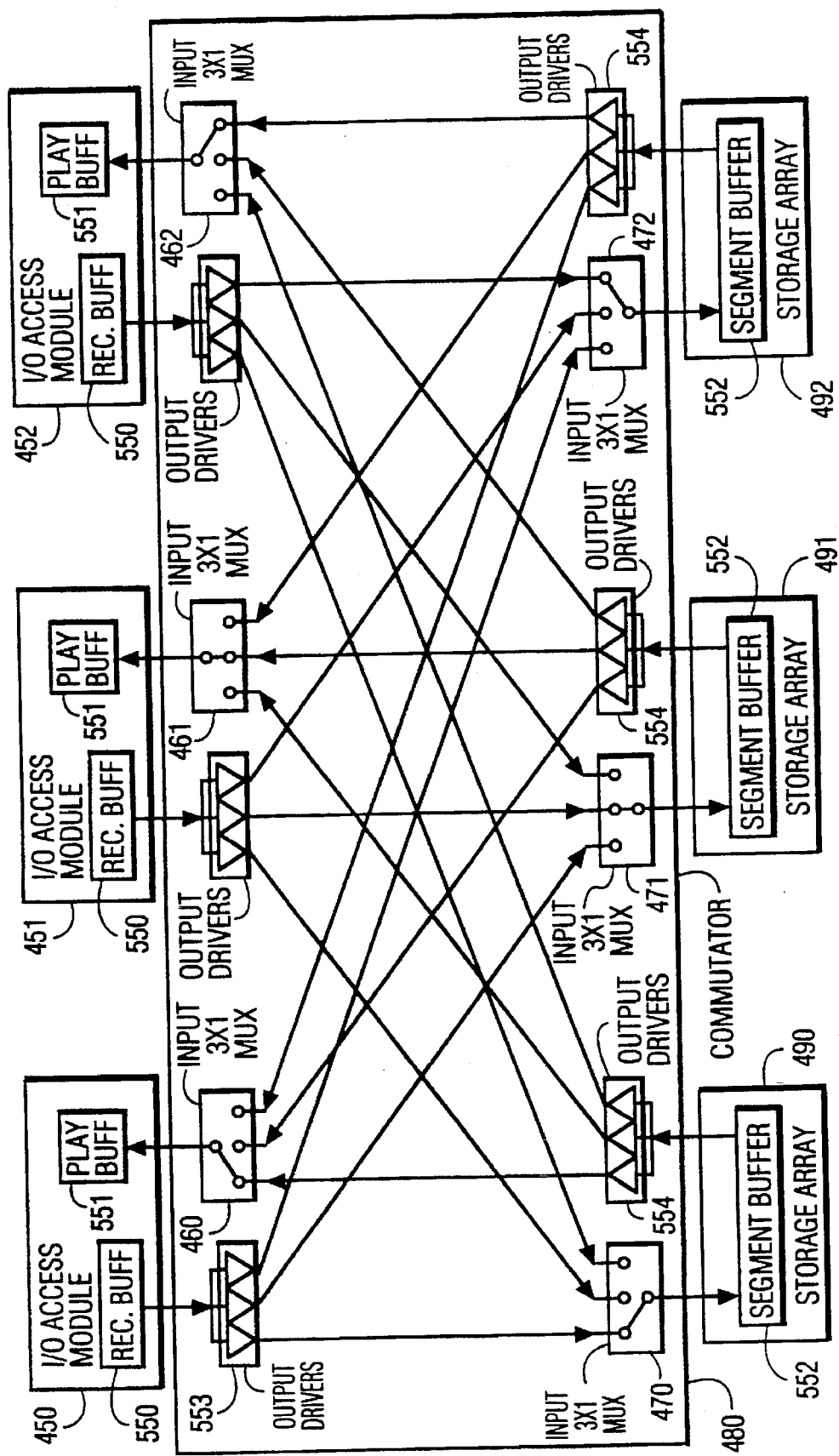

The paths of the systems shown in FIG. 6 and 7 can be either uni-directional or bi-directional. If they are all unidirectional, both of those system can be used combined into one system which enables bi-directional communication between the access channels and the storage arrays. FIG. 8 shows such a system.

The system shown in FIG. 8 has three I/O access modules 450–452; three storage arrays 490–492; and a commutator 480 having 6 MUXs 460–462 and 470–472. Three of the MUXs, e.g., the MUXs 460–462, are used in conjunction with reading data from the storage arrays 490–492; and the other 3 MUXs, e.g., the MUXs 470–472, are used for writing data to the storage arrays 490–492.

The system shown in FIG. 8 shows each of the I/O access modules 450–452 having a record buffer 550 included therein for buffering data which is to be written into the storage arrays 490–492 and a play buffer 551 included therein for buffering data which is read out from the storage arrays 490–492. The system shown in FIG. 8 also shows each of the storage arrays 490–492 having a segment buffer 552 included thereon for buffering data which is read in or to be read out of that storage array. Finally, the system shown in FIG. 8 shows the commutator 480 having output drivers 553 for connecting each of the I/O access modules 450–452 to the MUXs connected to each of the storage arrays 490–492, i.e., MUXs 470–472, and output drivers 554 for connecting each of the storage arrays 490–492 to the MUXs connected to each of the I/O access modules 450–452, i.e., MUXs 460–462.

The system of FIG. 8, and in particular the MUXs 460–462 and 470–472, is controlled by a controller (not shown), such as the controller 44 of FIG. 3 or the host computer 26 of FIG. 2, in a manner whereby each of the I/O access module 450–452 are connected sequentially to each of the storage array 490–492. The system of FIG. 8, through its duplicative paths between each of the I/O access modules 450–452 and storage arrays 490–492 is capable of either reading from and writing data to each of the storage arrays at any time.

Systems of the type described above are readily expandable by using a commutator with more paths (and MUXs if appropriate) and by adding additional storage arrays and input/output access channels. The trunk lines going to the commutator may be bi-directional read/write lines, or they may be dedicated read-only or write-only lines. Correspondingly, some access channels may be read-only or write-only. Each trunk line may be a single wire, or may be a cable containing more than one wire. Alternatively, each trunk line may be one or more optical fibers, the commutator then being an optical switching device.

Although the embodiments discussed above have the same number of input/output access channels (and modules) and storage arrays, i.e., N of each, the invention is also applicable to embodiments where there are N input/output access channels and M storage arrays, and N and M are different. Certain implementations of a system in accordance with the invention are such that there is no need for there to be as many input/output channels (and modules) as there are storage arrays. This results in less expensive systems as compared to the embodiments discussed above. Other implementations of a system in accordance with the invention are such that they require less storage arrays than input/output access channels. Such is the case when one or more active redundant input/output access channels is desired, or when less storage arrays have sufficient storage capacity to provide more input/output access channels each with a desired amount of data. The latter is an important point. For as compared to the embodiments discussed above, it enables unnecessary expensive storage arrays to be eliminated.

Figure 9:
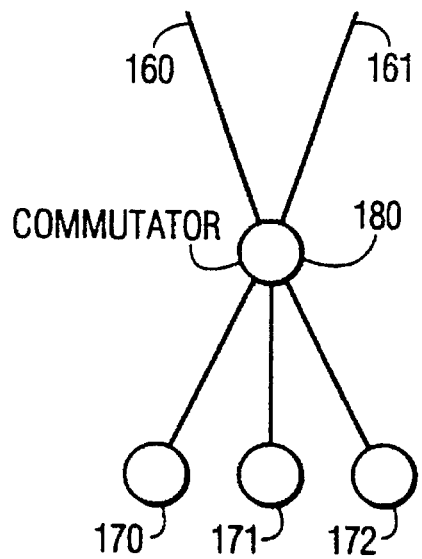
FIGS. 9 and 10 show block diagrams of embodiments of systems in accordance with the invention having a different number of input/output access channels and storage arrays.

FIG. 9 shows an embodiment of a system in accordance with the invention where there are less input/output access channels than there are storage arrays. The system shown in FIG. 6 has two I/O access channels 160 and 161, a commutator 180 and three storage arrays 170–172. The system shown in FIG. 9 operates in substantially the same manner as described above. More specifically, each of the I/O access channels 160 and 161 are connected via the commutator 180 by means of a controller (not shown), such as the controller 44 of FIG. 3 or the host computer 26 of FIG. 2, to each of the storage arrays 170–172 during a period T. However, during the period T, for a given period of time, each of the storage arrays 170–172 is not connected via the commutator 80 to one of the I/O access channels 160 and 161.

Figure 10:
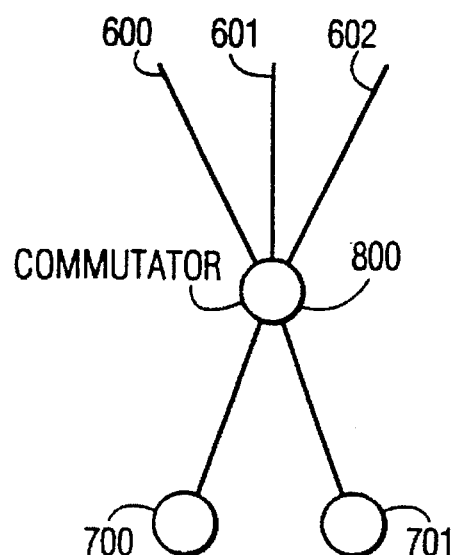

FIG. 10 shows an embodiment of a system in accordance with the invention where there are more input/output access channels than there are storage arrays. The system shown in FIG. 7 has three I/O access channels 600–602, a commutator 800 and two storage arrays 700 and 701. The system shown in FIG. 10 also operates in substantially the same manner as described above. More specifically, each of the I/O access channels 600–602 are connected via the commutator 800 by means of a controller (not shown), such as the controller 44 of FIG. 3 or the host computer 26 of FIG. 2, to each of the storage arrays 700 and 701 during a period T. However, during the period T, for a given period of time, each of the I/O access channels 600–602 is not connected via the commutator 800 to one of the storage arrays 700 and 701.

It should be noted that whether N is greater than M, N is less than N or N is equal to M, the commutator of a system in accordance with the invention will have at least Q established paths among the input/output access channels and the storage arrays at a time, where Q is the lesser of N and M when they are different and N when they are the same. Each of the Q established paths connects a different one of the access channels to a different one of the storage arrays. In addition, the commutator of a system in accordance with the invention will operate in a fashion whereby during a period T each of the input/output access channels will be connected to each and every one of the storage arrays for some amount of time by switching the Q established paths among the input/output access channels and the storage arrays. Preferably, each of the input/output access channels is connected to each of the storage array for a period t at a time during the period T. Accordingly, in certain embodiments, $T=P \times t$, where P is the greater of N and M when they are different and N when they are the same.

Embodiments of a system in accordance with the invention which employ less storage arrays than input/output access channels can be very costly and time efficient in situations where the input/output access channels of the system are coupled to downstream channels in which at least two of those downstream channels have different bandwidths than the input/output access channels and storage arrays of the system. (This of course is provided that the bandwidth of each of the downstream channels is less than or equal to the bandwidth of the input/output access channels and storage arrays, and the total bandwidth of all of the downstream channels does not exceed the total bandwidth of all of the storage arrays of the system.) This is because less storage arrays can be used to provide each of the downstream channels with data at its prescribed bandwidth.

Figure 11:
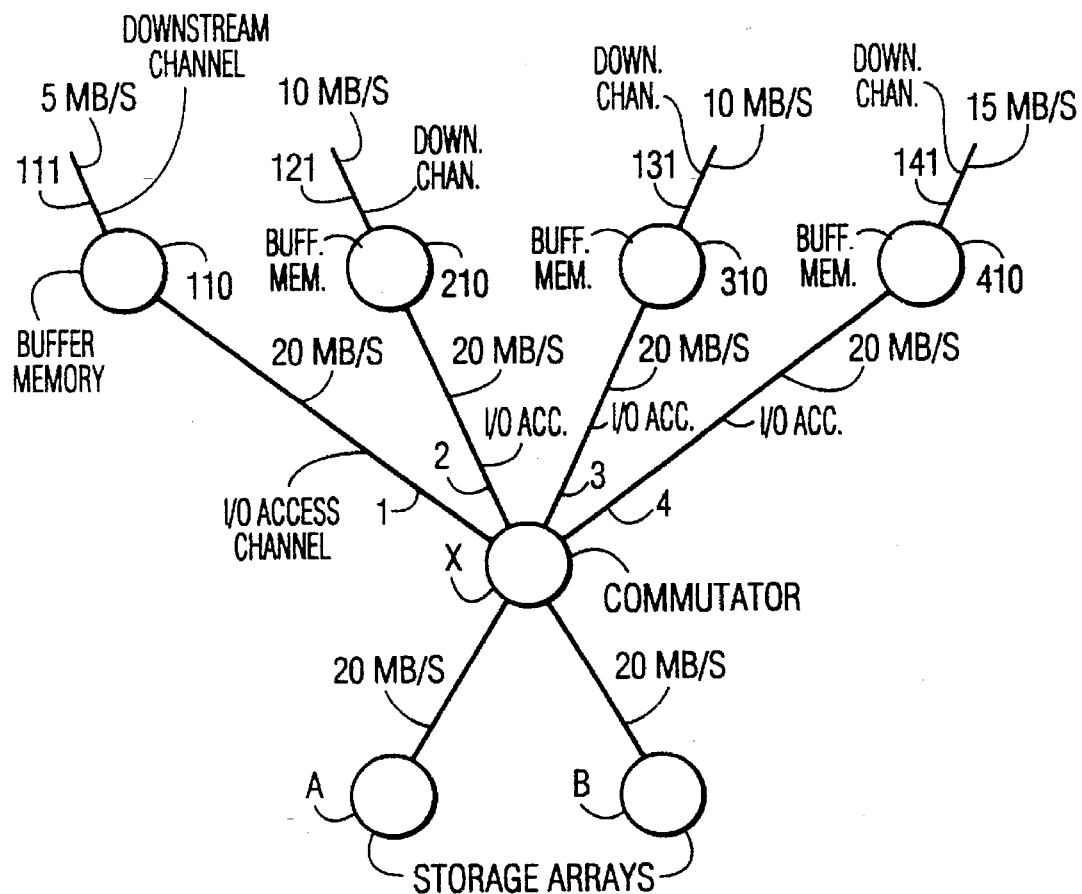
FIG. 11 shows a block diagrams of an embodiment of a system in accordance with the invention which is capable of supplying or receiving data from a user with a bandwidth which differs from the bandwidth employed by the input/output channels and the storage arrays of that system.

FIG. 11 shows an embodiment of a system in accordance with the invention where the bandwidth of at least two downstream channels connected to the input/output access channels via buffer memories is different from the bandwidth of the input/output access channels and storage arrays of the system. The system of FIG. 11 includes four I/O access channels 1, 2, 3 and 4, a commutator X and two storage arrays A and B. The bandwidth of the I/O access channels 1, 2, 3 and 4 and the storage arrays A and B of the system of FIG. 11 is 20 MB/s, and the total bandwidth of all of the storage arrays A and B of the system of FIG. 11 is 40 MB/s. The system of FIG. 11 further includes four buffer memories 110, 210, 310 and 410 connected respectively to the I/O access channels 1, 2, 3 and 4; and downstream channels 111, 121, 131 and 141 are connected. respectively to the buffer memories 110, 210, 310 and 410. The downstream channel 111 has a bandwidth of 5 MB/s; the downstream channel 121 has a bandwidth of 10 MB/s; the downstream channel 131 has a bandwidth of 10 MB/s; and the downstream channel 141 has a bandwidth of 15 MB/s. The total bandwidth of all of the downstream channels is 40 MB/s. Buffer memory 110 is capable of converting a data bit stream of 20 MB/s to 5 MB/s or vice-versa; buffer memories 210 and 310 are capable of converting a data bit stream of 20 MB/s to 10 MB/s or vice-versa; and buffer memory 410 is capable of converting a data bit stream of 20 MB/s to 15 MB/s or vice-versa.

It is noted that in other embodiments, the downstream channels could have different bandwidths. However, none of those bandwidths can be higher than the bandwidth of the input/output access channels and storage arrays, and the total bandwidth of all of the downstream channels cannot be greater than the total bandwidth of all of the storage arrays of the system.

Hereinafter, it will be assumed that the embodiment shown in FIG. 11 is being used as a video-on-demand type system in which data is being read out of the storage arrays. Nevertheless, what is described with respect to read out of the storage arrays also applies with respect to writing onto the storage arrays and/or a combination of both.

The commutator X of FIG. 11 is controlled by means of a controller (not shown) to cause each of the I/O access channels 1, 2, 3 and 4 to be connected to each and every one of the storage arrays for a sufficient amount of time in a period. $T_s$ so that each of the downstream channels receives a sufficient amount of data to maintain its bandwidth during the period $T_s$. The controller controls the commutator X so that the storage arrays A and B are connected to each and every one of the I/O access channels 1, 2, 3 and 4.

It is preferable to have the total bandwidth of all of the storage arrays of a system in accordance with the invention equal to the total bandwidth of all of the downstream channels connected to the system, as is the case in FIG. 11. In addition, it is preferable that the commutator be controlled to connect a given one of the storage arrays to a given one of input/output access channels for a period $t_s=T_s/(TB/LCF)$ at a time during the period $T_s$, where TB is the total bandwidth of all of the downstream channels and LCF is the least common factor of all of the downstream channel bandwidths. (The value of $t_s$ can be derived in a similar fashion for systems where the total bandwidth of all of the downstream channels is not equal to the total bandwidth of all of the storage arrays of the system.) As a result, during a period $T_s$ one or more of the input/output access channel may be connected to one or more of the storage arrays more than once.

Figure 12:
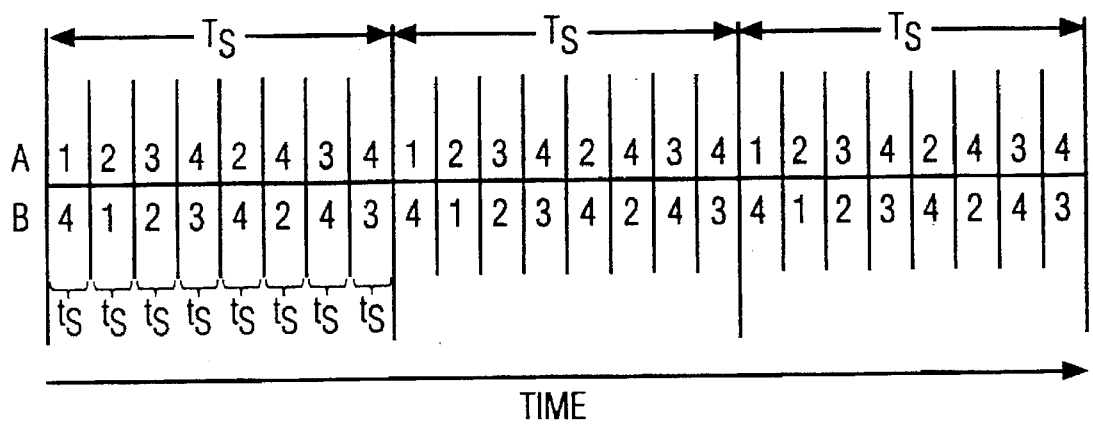
FIG. 12 shows a time chart indicating a sequence in which the input/output access channels of the system of FIG. 11 are connected to the storage arrays of that system.

FIG. 12 shows an example of a sequence which may be used in connecting the I/O access channels 1, 2, 3 and 4 of FIG. 11 to the storage arrays A and B of FIG. 11 during the period $T_s$, where an given I/O access channel is connected to a given storage array for only a period $t_s$ at a time. It is noted that in the system shown in FIG. 11, TB=40 and LCF=5. Accordingly, $T_s/t_s=8$. Since downstream channel 111 has a bandwidth of 5 MB/s and that is equal to LCF, the I/O access channel 1 is connected to storage arrays A and B only once during the period $T_s$. Since downstream channels 121 and 131 each have a bandwidth of 10 MB/s and that is equal to 2LCF, the I/O access channels 2 and 3 are each connected to the storage arrays A and B twice during the period $T_s$. Finally, since downstream channel 113 has a bandwidth of 15 MB/s and that is equal to 3LCF, the I/O access channel 4 is connected to storage arrays A and B three times during the period $T_s$.

It is noted that in the example shown in FIG. 12, the same sequence is repeated for each period $T_s$. Accordingly, if the commutator X of FIG. 11 was to operate in accordance with that sequence, it would be operating in a cyclic fashion.

The sequence shown in FIG. 12 is intended only as an example, and is not in anyway intended to limit the invention. Numerous other sequences can be used by persons skilled in the art, and those sequences need not be repeated.

Finally, it should be noted that FIG. 11 could also include additional storage arrays and I/O access channels (and buffer memories and downstream channels) which are either active or inactive. If those additional elements are inactive, then the embodiment of FIG. 11 would operate in substantially the manner as described above. However, if the additional element are active, then the controller can be programmed to operate the commutator in accordance with the manner described herein.

It is to be understood that the above described embodiments are for purposes of illustration only and not to be construed as a limitation of the invention. Numerous alterations and modifications of the system disclosed herein, its arrangement and its structure will present themselves to those skilled in the art. All such modifications which do not depart from the spirit of the invention are intended to be included within the scope of the appended claims.

What is claimed is:

1. A system for storing large amounts of data and for providing simultaneous plural access to the data, the system comprising:

an access medium having N access channels;

a mass storage medium having M individual storage arrays for storing the data;

a commutator having establishable paths for connecting each of said access channels to each of said storage arrays, said commutator having Q paths established at a time, which each connects a different one of said access channels to a different one of said storage arrays, where Q is equal to the lesser of N and M when they are different and N when they are the same; and control means for controlling said commutator to cause said commutator to switch the Q paths which are established so that in a period T each of said access channels is connected to each and every one of said storage arrays by means of said paths.

2. The system as claimed in claim 1, wherein each of said paths is bi-directional.

3. The system as claimed in claim 1, wherein said control means causes said commutator to connect said access channels to said storage arrays in a cyclic fashion.

4. The system as claimed in claim 1, wherein said control means is adapted to switch the Q paths which are established so that each of said access channels is connected to each of said storage arrays for a period t at a time during the period T.

5. The system as claimed in claim 4, wherein each of said access channels is connected to each of said storage arrays only once during the period T such that T=P×t, where P is the greater of N and M when they are different and N when they are the same.

6. The system as claimed in claim 4, wherein N is greater than M, and during the period T, at least one of said access channels is connected to each of said storage arrays at least twice.

7. The system as claimed in claim 1, wherein said paths are adapted to transfer data between each of said access channels and each of said storage arrays at a system bandwidth.

8. The system as claimed in claim 7, wherein N is greater than M, and the system further comprises downstream channels, which each is coupled to a different one of said access channels and has a bandwidth, in which at least two of said downstream channels have bandwidths which differ from the system bandwidth.

9. The system as claimed in claim 8, wherein each of said downstream channels which has a bandwidth which differs from the system bandwidth is coupled to a different one of said access channels by means of a buffer memory which can convert between the system bandwidth and the bandwidth of that downstream channel.

10. The system as claimed in claim 8, wherein said control means is adapted to cause said commutator to switch the Q paths which are established so that each downstream channel receives a sufficient amount of data during a period $T_s$ to maintain the bandwidth of that downstream channel.

11. The system as claimed in claim 10, wherein the period $T_s$ is equal to the period T.

12. The system as claimed in claim 10, wherein the period $T_s$ is greater than the period T.

13. The system as claimed in claim 10, wherein said control means is further adapted to switch the Q paths which are established so that each of said access channels is connected to each of said storage arrays for a period $t_s=T_s/(TB/LCF)$ at a time during the period $T_s$, where TB is the sum of the bandwidths of all of the downstream channels and LCF is a least common factor of the bandwidths of all of the downstream channel bandwidths.

14. The system as claimed in claim 13, wherein during the period $T_s$, at least one of said access channels is connected to each of said storage arrays at least twice.

15. The system as claimed in claim 13, wherein during the period $T_s$, each of said access channels is connected to each of said storage arrays B/LCF times, where B is the bandwidth of the downstream channel coupled to that access channel.

16. The system as claimed in claim 1, wherein said data is compressed video data representing a plurality of movies.

17. The system as claimed in claim 16, wherein said access medium is part of a cable television system.

18. The system as claimed in claim 1,
wherein said commutator is a cross-point matrix switch having N inputs and M outputs, connecting means for selectively connecting said inputs to said outputs, and addressing means for controlling said connecting means, said addressing means having an address input, said control means including means for generating addresses for application to said address input of said addressing means for causing said cross-point matrix switch to connect each of said inputs to each and every one of said outputs in the period T.

19. The system as claimed in claim 18, wherein during the period T none of said inputs is connected to more than one output at a time and none of said output is connected to more than one input at time.

20. The system as claimed in claim 1, wherein said commutator comprises:
N 1-by-M multiplexers, each having one first input and M first outputs, and first connecting means for selectively connecting said first input to said first outputs, each of said first inputs being coupled to a different one of said access channels, and each of said first outputs of each of said 1-by-M multiplexers being coupled to a different one of said storage arrays so that each of said storage arrays is coupled to each of said 1-by-M multiplexers; and
M 1-by-N multiplexers, each having one second input and N second outputs, and second connecting means for selectively connecting said second input to said second outputs, each of said second inputs being coupled to a different one of said storage arrays, and each of said second outputs of each of said 1-by-N multiplexers being coupled to a different one each of said access channels so that each of said access channels is coupled to each of said 1-by-N multiplexers;

wherein said control means is further adapted for controlling each of said first and second connecting means so that each of said access channels is connected to each and every one of said storage arrays in the period T.

21. The system as claimed in claim 20, wherein said control means is further adapted to control said first and second connecting means in a manner whereby during the period T none of said access channels is connected to more than one of said storage arrays at a time and none of said storage arrays is connected to more than one of said access channels at time.

22. A system for storing large amounts of data and for providing simultaneous plural access to the data, the system comprising:
an access medium having N access channels;
a mass storage medium having M individual storage arrays for storing the data;
a commutator having Z establishable paths for connecting each of said access channels to each of said storage arrays, in which Q of said paths are established at a time, which Q paths each connects a different one of said access channels to a different one of said storage arrays, where Z is greater than Q, and Q is the lesser of N and M when they are different and N when they are the same; and
control means for controlling said commutator to cause said commutator to switch the Q paths which are established among said access channels and said storage arrays so that in a period T each of said access channels is connected to each and every one of said storage arrays by means of said paths.

23. The system as claimed in claim 22, where Z is equal to Q.

24. The system as claimed in claim 22, where Z is equal to N×M.

25. The system as claimed in claim 22, wherein Z is equal to 2(N×M).

26. A system for storing large amounts of data and for providing simultaneous plural access to the data, the system comprising:
an access medium having N access channels;
a mass storage medium having M individual storage arrays for storing the data;
a commutator having establishable paths for connecting each of said access channels to each of said storage arrays, said commutator having Q paths established at a time, which each connects a different one of said access channels to a different one of said storage arrays, where Q is equal to the lesser of N and M when they are different and N when they are the same; and
control means for controlling said commutator to cause said commutator to switch the Q paths which are established so that (i) each of said access channels is connected to each and every one of said storage arrays by means of said paths during a period T and (ii) each of said access channels is connected to each of said storage arrays by means of said paths for a period t during the period T.

27. The system as claimed in claim 26, wherein the data is recorded onto said storage medium in segments distributed sequentially among said storage arrays, each of said segments being wholly accessible within the period time t, whereby each of said access channels may access the same data within a period (P−1)×t, where P is the greater of N and M when they are different and N when they are the same.

28. The system as claimed in claim 27, wherein each of said storage arrays comprises input/output means and a plurality of storage sections each having an input/output line, said input/output means of each of said storage arrays comprising said input/output lines in combination, thereby enabling plural access to said storage sections in parallel.

29. The system as claimed in claim 28, wherein each of said access channels comprises input/output means and a plurality of access sub-channels each having an input/output line, said input/output means of each of said access channels comprising said input/output lines in combination, thereby enabling parallel processing by said access sub-channels of data accessed from said storage sections in parallel.

30. The system as claimed in claim 29, wherein said input/output lines of said storage sections and said access sub-channels have a first bit rate, and said control means causes the data to be transferred from said storage sections to said access sub-channels at the first bit rate during each time t, each of said access sub-channels including a access line having a second bit rate, slower than said first bit rate, for providing the data, and a buffer memory for temporarily storing the data accessed from said storage sections to compensate for the dissimilarity between the first and the second bit rates.

31. The system as claimed in claim 28, wherein said storage sections are magnetic disks.

32. The system as claimed in claim 28, wherein the data is written into at least two of said storage sections redundantly.

33. A system for storing large amounts of data and for providing simultaneous plural access to the data, the system comprising:
   an access medium having N access channels;
   a mass storage medium having M individual storage arrays for storing the data;
   a commutator having establishable paths for connecting each of said access channels to each of said storage arrays; and
   control means for controlling said commutator to cause each of said access channels to be connected to each and every one of said storage arrays by means of said paths in a period T;
   wherein said commutator comprises N 1-by-M multiplexers, each having one input and M outputs, and connecting means for selectively connecting said input to said outputs; and said control means is adapted for controlling each of said connecting means so that said input of each of said multiplexers is connected to each and every one of said outputs of that multiplexer during the period T.

34. The system as claimed in claim 33, wherein each of said inputs is coupled to a different one of said access channels; each of said outputs of each of said multiplexers is coupled to a different one of said storage arrays so that each of said storage arrays is coupled to each of said multiplexers; and said control means is further adapted to control said connecting means in a manner whereby during the period T none of said access channels is connected to more than one of said storage arrays at a time and none of said storage arrays is connected to more than one of said access channel at time.

35. A system for storing large amounts of data and for providing simultaneous plural access to the data, the system comprising:
   an access medium having N access channels;
   a mass storage medium having M individual storage arrays for storing the data;
   a commutator having establishable paths for connecting each of said access channels to each of said storage arrays; and
   control means for controlling said commutator to cause each of said access channels to be connected to each and every one of said storage arrays by means of said paths in a period T;
   wherein said commutator comprises M 1-by-N multiplexers, each having one input and N outputs, and connecting means for selectively connecting said input to said outputs; and said control means is adapted for controlling each of said connecting means so that said input of each of said multiplexers is connected to each and every one of said outputs of that multiplexer during the period T.

36. The system as claimed in claim 35, wherein each of said inputs is coupled to a different one of said storage arrays; each of said outputs of each of said multiplexers is coupled to a different one of said access channels so that each of said access channels is coupled to each of said multiplexers; and said control means is further adapted to control said connecting means in a manner whereby during the period T none of said access channels is connected to more than one of said storage arrays at a time and none of said storage arrays is connected to more than one of said access channels at time.

37. A system for storing large amounts of data and for providing simultaneous plural access to said stored data, said system comprising:
   an access medium having N access channels;
   a mass storage medium having M individual storage arrays for storing the data;
   a commutator having Q established paths at a time, which each connects a different one of said access channels to a different one of said storage arrays, where Q is the lesser of N and M when they are different and N when they are the same; and
   control means for controlling said commutator to cause said commutator to switch said paths among said access channels and said storage arrays so that $$T = P \times t,$$

where P is the greater of N and M when they are the same and N when they are different, t is the time in which one of said paths connects one of said access channels to one of said storage arrays, and T is the time in which one of said access channels is connected to each and every one of said storage arrays by means of said paths.

38. A system for storing large amounts of data and for providing simultaneous plural access to the data, the system comprising:
   an access medium having N access channels;
   a mass storage medium having M individual storage arrays for storing the data, where M is less than N;
   a commutator having M established paths at a time, which each (i) connects a different one of said access channels to a different one of said storage arrays and (ii) is adapted to transfer data between one of said access channels and one of said storage arrays at a system bandwidth;
   N downstream channels, which each is coupled to a different one of said access channels and has a bandwidth, in which at least two of said downstream channels have bandwidths which differ from the system bandwidth; and control means for controlling said commutator to cause said commutator to switch said paths among said access channels and said storage arrays so that (i) each of said access channels is connected to each and every one of said storage arrays by means of said paths during a period $T_s$ and (ii) each downstream channel receives a sufficient amount of data during the period $T_s$ to maintain its bandwidth.

39. The system as claimed in claim 38, wherein each of said downstream channels which has a bandwidth which differs from the system bandwidth is coupled to a different one of said access channels by means of a buffer memory which can convert between the system bandwidth and the bandwidth of that downstream channel.

40. A system for storing large amounts of data and for providing simultaneous plural access to the data, the system comprising:

an access medium having N access channels;

a mass storage medium having M individual storage arrays for storing the data, where M is less than N;

a commutator having M established paths at a time, which each (i) connects a different one of said access channels to a different one of said storage arrays and (ii) is adapted to transfer data between one of said access channels and one of said storage arrays at a system bandwidth;

N downstream channels, which each is coupled to a different one of said access channels and has a bandwidth, in which at least two of said downstream channels have bandwidths which differ from the system bandwidth; and control means for controlling said commutator to cause said commutator to switch said paths among said access channels and said storage arrays so that each downstream channel receives a sufficient amount of data during a period $T_s$ to maintain its bandwidth, in which said paths are switch in a manner whereby each of said access channels is connected to each of said storage arrays for a period $t_s = T_s/(TB/LCF)$ at a time during the period $T_s$, where TB is the sum of the bandwidths of all of the downstream channels and LCF is a least common factor of the bandwidths of all of the downstream channel bandwidths.

41. The system as claimed in claim 40, wherein during the period $T_s$, at least one of said access channels is connected to each of said storage arrays at least twice.

42. The system as claimed in claim 40, wherein during the period $T_s$, each of said access channels is connected to each of said storage arrays B/LCF times, where B is the bandwidth of the downstream channel coupled to that access channel.

* * * * *